United States Patent
Houk et al.

(10) Patent No.: US 9,809,755 B2
(45) Date of Patent: Nov. 7, 2017

(54) EXTRUDER FOR PROCESSING HYDROCARBON-CONTAINING MATERIALS

(71) Applicant: The Bonnot Company, Uniontown, OH (US)

(72) Inventors: Kurt G. Houk, Uniontown, OH (US); George Bain, Uniontown, OH (US)

(73) Assignee: The Bonnot Company, Uniontown, OH (US)

( * ) Notice: Subject to any disclaimer, the term of this patent is extended or adjusted under 35 U.S.C. 154(b) by 1050 days.

(21) Appl. No.: 13/970,727

(22) Filed: Aug. 20, 2013

(65) Prior Publication Data

US 2014/0054815 A1 Feb. 27, 2014

Related U.S. Application Data

(60) Provisional application No. 61/691,907, filed on Aug. 22, 2012.

(51) Int. Cl.
| | |
|---|---|
| *B29C 35/02* | (2006.01) |
| *C10B 57/08* | (2006.01) |
| *B29C 47/60* | (2006.01) |
| *B29C 47/82* | (2006.01) |
| *B29C 47/84* | (2006.01) |
| *B29C 47/92* | (2006.01) |
| *B29B 17/00* | (2006.01) |
| *C10B 53/07* | (2006.01) |
| *B01F 3/20* | (2006.01) |
| *B01F 7/00* | (2006.01) |
| *B01F 15/06* | (2006.01) |
| *C10G 1/10* | (2006.01) |
| *B29C 47/08* | (2006.01) |
| *B29C 47/76* | (2006.01) |

(Continued)

(52) U.S. Cl.
CPC ............ *C10B 57/08* (2013.01); *B01F 3/2071* (2013.01); *B01F 7/00708* (2013.01); *B01F 7/00816* (2013.01); *B01F 15/065* (2013.01); *B29B 17/0036* (2013.01); *B29C 35/02* (2013.01); *B29C 47/6006* (2013.01); *B29C 47/6018* (2013.01); *B29C 47/6025* (2013.01); *B29C 47/822* (2013.01); *B29C 47/845* (2013.01); *B29C 47/92* (2013.01); *C10B 53/07* (2013.01); *C10G 1/10* (2013.01); *B29B 2017/0496* (2013.01); *B29C 47/0844* (2013.01); *B29C 47/369* (2013.01); *B29C 47/767* (2013.01); *B29C 2947/92704* (2013.01); *B29L 2030/00* (2013.01); *C10G 2300/1003* (2013.01); *C10G 2300/4006* (2013.01); *C10G 2300/4037* (2013.01); *C10G 2300/4056* (2013.01); *Y02P 20/143* (2015.11); *Y02W 30/62* (2015.05); *Y02W 30/625* (2015.05)

(58) Field of Classification Search
CPC ..................................................... B29C 35/02
USPC .......................... 366/75, 76.9, 81, 82, 88–90
See application file for complete search history.

(56) References Cited

U.S. PATENT DOCUMENTS 5,158,725 A * 10/1992 Handa ..................... B29B 7/726
264/211

* cited by examiner

*Primary Examiner* — David Sorkin
(74) *Attorney, Agent, or Firm* — Fay Sharpe LLP

(57) ABSTRACT

An extruder for processing hydrocarbon-containing material. The extruder includes a screw that is rotatably positioned in a barrel liner and a heating system positioned about at least a portion of the barrel liner that is designed to heat the hydrocarbon-containing material as the hydrocarbon-containing material moves through the barrel liner.

27 Claims, 12 Drawing Sheets

(51) Int. Cl.
*B29C 47/36* (2006.01)
*B29L 30/00* (2006.01)
*B29B 17/04* (2006.01)

EXTRUDER FOR PROCESSING HYDROCARBON-CONTAINING MATERIALS

The present invention claims priority on U.S. Provisional Patent Application Ser. No. 61/691,907 filed Aug. 22, 2012, which is incorporated herein by reference.

The present invention is a device used to process recycled hydrocarbon containing materials and feed such materials to a reactor for further processing.

BACKGROUND OF THE INVENTION

Heating oil and diesel oil obtained by depolymerization of hydrocarbon-containing residues are well known in the art. The depolymerization of the hydrocarbon-containing raw materials takes place by injecting the raw material, such as plastics or spent oil, as a liquid or slurry in a preheated state under pressure into a reactor heated to the cleavage temperature. A vapor fraction is taken from the reactor, which is heated indirectly via the jacket surface to an internal temperature of 420° C., for example, and a diesel or heating oil fraction is obtained directly from said vapor fraction by fractional distillation. The solid matter accumulating in the reactor is continuously removed and processed further.

Prior to the hydrocarbon feedstock being fed into the pyrolysis reactor, the feedstock is preheated. During the preheating process, water vapor and other types of gases (e.g., chlorine gas, etc.) are produced and can be difficult to handle and be disposed of safely.

Currently, there is no satisfactory process to preheat the feedstock and effectively dispose of gases generated from the preheating of the feedstock. As such, there continues to remain a need for an apparatus for feedstock for a pyrolysis reactor and which apparatus can effectively dispose of gases generated from the preheating of the feedstock.

SUMMARY OF THE INVENTION

The present invention is directed to an extruder arrangement that can be used to preheat feedstock for use in a reactor, such as, but not limited to, a pyrolysis reactor.

It is one non-limiting object of the present invention to provide an extruder arrangement that can be used to preheat feedstock for use in a reactor that includes a motor, a gear box, and optionally a hopper.

It is another and/or alternative non-limiting object of the present invention to provide an extruder arrangement that can be used to preheat feedstock for use in a reactor that can accept one or more types of hydrocarbon material such as, but not limited to, shredded plastic, shredded tires, roof shingles, asphalt from roads, etc.

It is still another and/or alternative non-limiting object of the present invention to provide an extruder arrangement that can be used to preheat feedstock for use in a reactor that includes a hopper that is designed to further grind and/or shred the feed material fed into the hopper.

It is yet another and/or alternative non-limiting object of the present invention to provide an extruder arrangement that can be used to preheat feedstock for use in a reactor that includes auger barrels and screw.

It is still yet another and/or alternative non-limiting object of the present invention to provide an extruder arrangement that can be used to preheat feedstock for use in a reactor that includes a screw having varying flight spacing along the length of the screw.

It is another and/or alternative non-limiting object of the present invention to provide an extruder arrangement that can be used to preheat feedstock for use in a reactor that includes a screw having varying flight angles along the length of the screw.

It is still another and/or alternative non-limiting object of the present invention to provide an extruder arrangement that can be used to preheat feedstock for use in a reactor that includes a screw having varying root depths along the length of the screw.

It is yet another and/or alternative non-limiting object of the present invention to provide an extruder arrangement that can be used to preheat feedstock for use in a reactor that includes a screw having one or more flight breaks along the length of the screw.

It is still yet another and/or alternative non-limiting object of the present invention to provide an extruder arrangement that can be used to preheat feedstock for use in a reactor that includes a screw having a center bore that extends fully or partially the length of the screw and which center bore can be used to cool the screw.

It is another and/or alternative non-limiting object of the present invention to provide an extruder arrangement that can be used to preheat feedstock for use in a reactor that includes one or more barrel liners that have a heating jacket and/or a heating band designed to heat feed material inside the barrel liners.

It is still another and/or alternative non-limiting object of the present invention to provide an extruder arrangement that can be used to preheat feedstock for use in a reactor that includes a port in a side of a barrel that is designed to remove liquids and/or gases that have formed during the heating of the feed material, which port may or may not be under a vacuum.

It is yet another and/or alternative non-limiting object of the present invention to provide an extruder arrangement that can be used to preheat feedstock for use in a reactor that includes a barrel and screw arrangement that creates a pressure drop in the interior of one or more portions of the barrel liners.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein.

DETAILED DESCRIPTION OF ONE NON-LIMITING EMBODIMENTS

Figure 1:
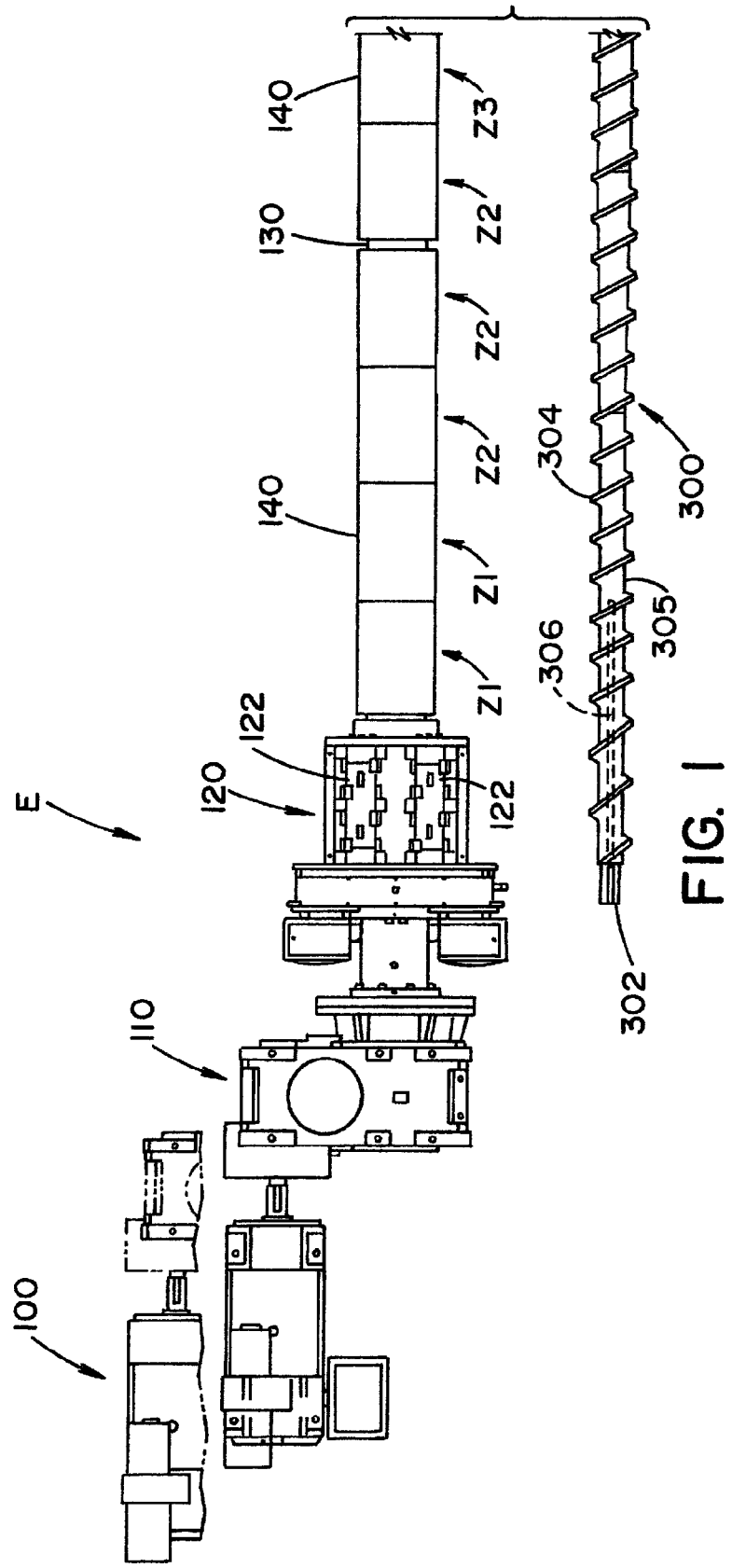
FIGS. 1 and 2 illustrate a side plan view of the extruder system in accordance with the present invention and a side plan view of one non-limiting screw that can be used in the extruder system.

Referring now to the drawings wherein the showings are for the purpose of illustrating one non-limiting embodiment of the invention only and not for the purpose of limiting same, FIGS. 1-12 illustrate one non-limiting extruder system E in accordance with the present invention. The extruder system is designed to be used to process recycled hydrocarbon-containing materials and feed such materials to a reactor for further processing. The extruder system can be used to preheat feedstock and effectively dispose of gases generated from the preheating of the feedstock. The feed material or feedstock can be any type of hydrocarbon material. Non-limiting examples of such material include shredded plastic, shredded tires, asphalt shingles, and/or road asphalt.

Figure 2:
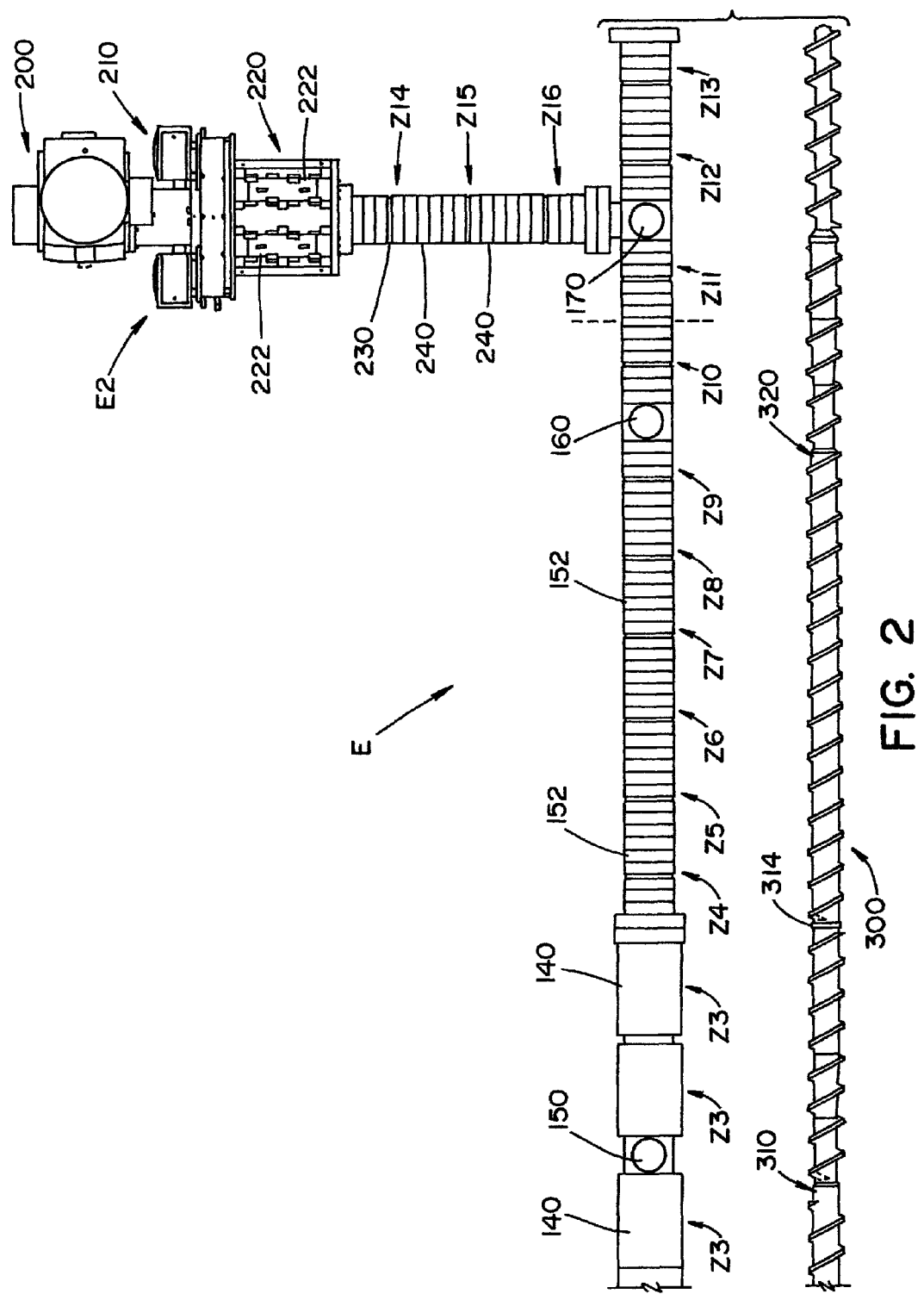

Referring now to FIGS. 1-2, there is illustrated a side view of one non-limiting embodiment of the extruder system of the present invention that can be used to process the hydrocarbon containing feedstock. The extruder system E includes one or more motors 100 and one or more gear boxes 110. The type and/or size of motor and/or gear box are non-limiting. A hopper 120 is illustrated as being connected or interconnected to the gear box. The hopper is generally used to receive the feedstock. The top and/or side of the hopper includes an opening wherein feedstock can be fed into the hopper. The hopper can optionally include one or more components such as grinders 122 that are used to grind and/or shred the feedstock while located in the hopper. The grinders can include one or more grinding teeth and/or other structures that can be used to grind and/or shred the feedstock while located in the hopper. The grinders, when used, are generally driven by the motor and gear box arrangement; however, this is not required.

The feedstock that is typically fed into the hopper has an average size of less than about 3 inches, and typically less than 2 inches; however, other sizes of the feedstock pieces can be inserted into the hopper. For example, the shredded plastic material, when used, can have an average size of no greater than about 0.5 inches, and typically no greater than about 0.25 inches; however, other sizes can be used. In another non-limiting example, the shredded tire pieces, when used, can have an average size of no greater than about 2.5 inches, and typically no greater than about 2 inches; however, other sizes can be used. When the hopper includes one or more grinders, the grinders can be designed to further grind and/or shred the feed material in the hopper; however, this is not required. All of the feedstock can be fed into the extruder system at the location of the hopper, and/or at a different location, as will be discussed below. The method by which the feedstock is fed to the hopper is non-limiting (manual feeding system, conveyor feeding system, etc.). The feedstock can be preheated prior to being fed into the hopper; however, this is not required.

One or more auger barrels 130 are connected to one end of the hopper. The feedstock that is fed into the hopper is ultimately directed into the interior of the one or more auger barrels. Rotatably positioned inside the one or more auger barrels is a screw 300. As illustrated in FIGS. 1 and 2, the screw is positioned below and relative to the gear box, hopper and auger barrel to illustrate the relative position of the screw to the components of the extruder system when the screw is positioned in the hopper and auger barrel and connected to the gear box. As will be described in more detail below, the rotation of the screw is designed to draw the feedstock from the hopper and to move the feedstock through the barrels during the heat processing of the feedstock.

The front end 302 of the screw 300 is connected to gear box 110. The manner in which the screw is connected to the gear box is non-limiting. The gear box is designed to cause the screw to rotate during the operation of the motor of the extruder. The front portion of screw 300 is illustrated in detail in FIG. 3. The width W of the screw is non-limiting. For purposes of describing the screw, the width W of the screw is about eight includes; however, it can be appreciated that the width of the screw can be a 1 inch, 2 inch, 4 inch, 6 inch, 10 inch, etc.

Figure 3:
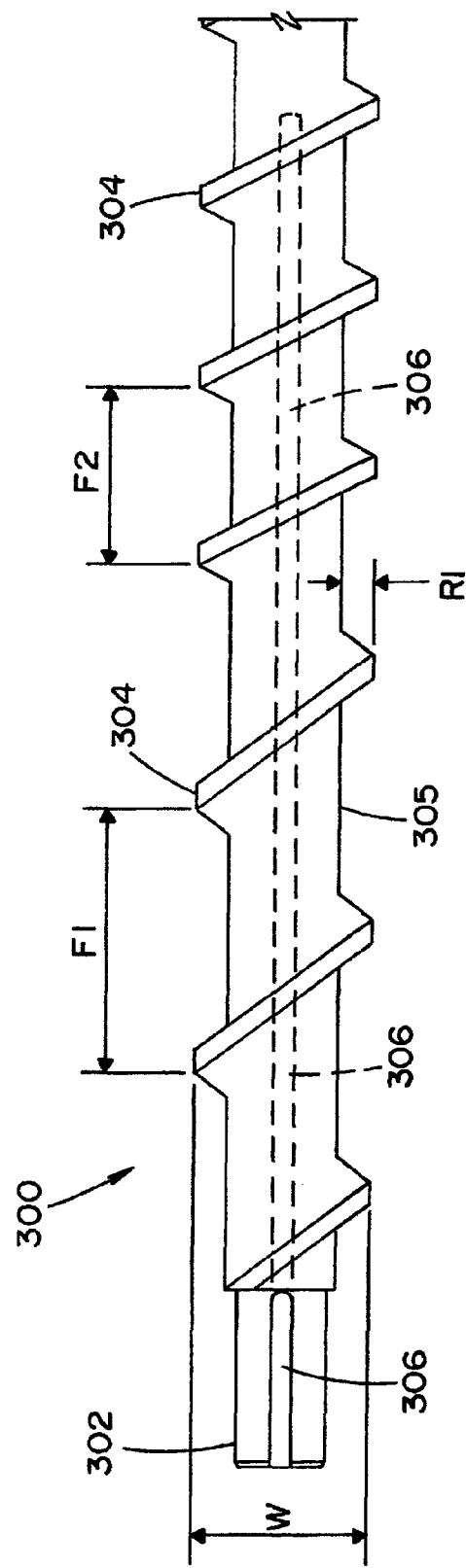
FIGS. 3-12 illustrate enlarged sections of the screw that is illustrated in FIGS. 1 and 2.
Figure 4:
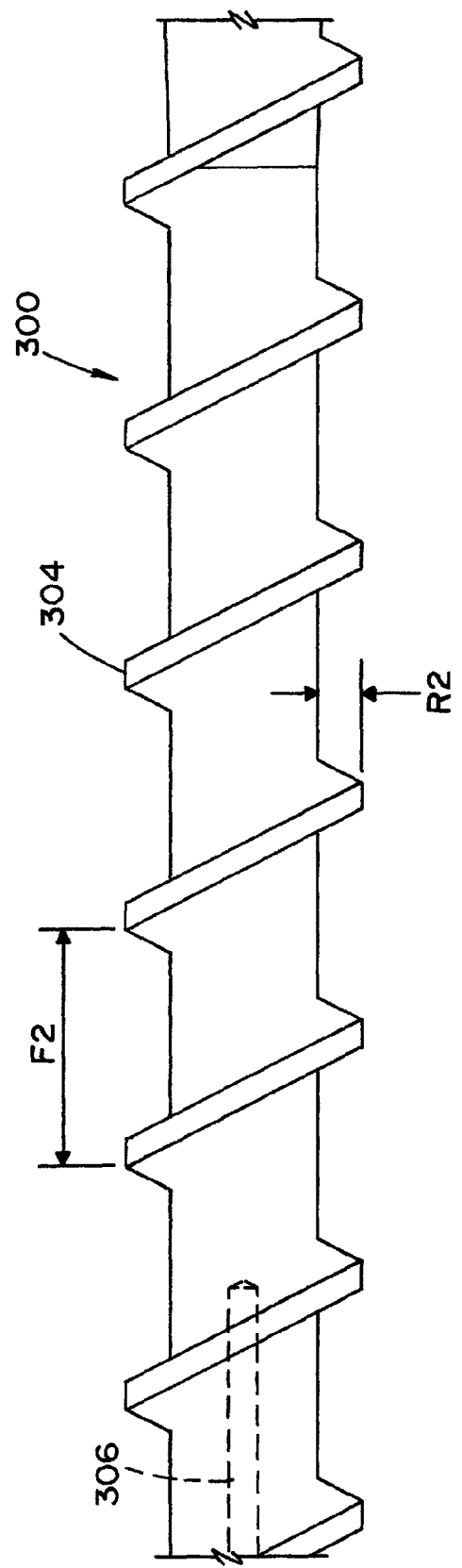

The screw 300 includes flights 304. As illustrated in FIGS. 1 and 3, the flight spacing varies along the front portion of the screw; however, this is not required. When the flight spacing varies, generally the flight spacing is greater near the front end of the screw and then reduces continuously or a some point along the front portion of the screw. As best illustrated in FIG. 3, the flight spacing F1 is greater than flight spacing F2. FIG. 3 illustrates that the transition between the two flights is not a continuous change, but occurs in a relatively small region of the front portion of the screw; however, this is not required. Generally, the flight spacing reduction is at least about 5%, typically at least about 10%, more typically about 10-50%, and still more typically about 15-40%. For example, for an 8-inch width screw, F1 is about 12 inches and F2 is about 8 inches which is a 33% reduction in length.

The front portion of the screw has a root depth R1 that is generally constant along the length of the front portion; however, this is not required. The root depth is the distance between the outer surface 305 of the core of the screw to the top surface of the flight 304. For example, for an 8-inch width screw, the root depth at the front portion of the screw can be about 1.5 inches; however, other root depths can be used. The flight spacing of the screw is illustrated as reducing from 12 inches to 8 inches; however, this is not required. As can be appreciated, the flight spacing illustrated in FIG. 3 is non-limiting. The type and number of flights on the screw are non-limiting. As illustrated in FIGS. 3-12, once the flight spacing has reduced, the flight spacing can remain constant along the remaining length of the screw; however, this is not required. As illustrated in FIG. 1, the flight length reduction occurs between the hopper and zone Z1 of the extruder system; however, this is not required.

The front portion of the screw can optionally include a center bore 306 that can be used as a fluid channel to cool the front portion of the screw; however, this is not required. As illustrated in FIG. 3, the center bore only extends partially along the longitudinal length of the screw; however, this is not required. Any type of cooling fluid can be used to cool the screw (e.g., gas, water, antifreeze, etc.).

Referring again to FIG. 1, the outer surface of the barrel liners include one or more heating jackets 140. The heating jackets are designed to heat the feedstock as the feedstock is moved inside the barrel liners by the rotation of the screw. The number, size, and configuration of the one or more heating jackets, when used, is non-limiting. The heating jackets can be heated by fluid (e.g., heated oil, steam, etc.) flowing and/or circulating through the heating jackets and/or can be electric heaters. Generally, the heating jackets are designed to heat the feedstock to a temperature of about 200-700° F., typically about 300-600° F., and more typically about 350-450° F.; however, other temperatures can be used. The heating of the feedstock in the beginning or front portion of the extruder system causes the water in the feedstock, if any, to convert to water vapor. In the front portion of the extruder system, which is illustrated by three zones Z1, Z2, Z3, the feedstock is heated/cooked so as to begin destroying the chemical bonds of the feedstock material. For plastic feed material, the viscosity of the plastic material is reduced in zones Z1, Z2, Z3. For feed material such as tire pieces, tire pieces soften in zones Z1, Z2, Z3, but typically do not melt. The length of each of the zones is non-limiting.

Figure 5:
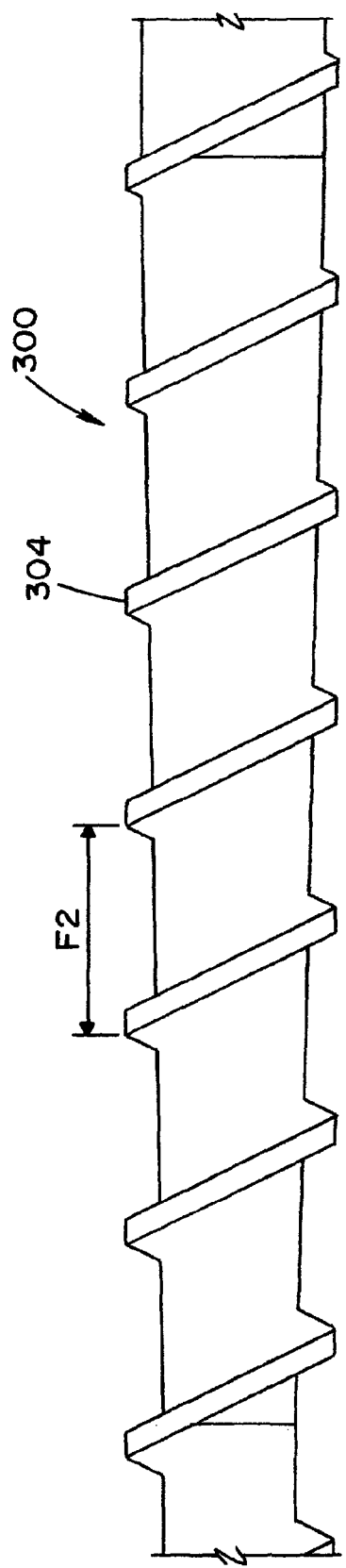
Figure 6:
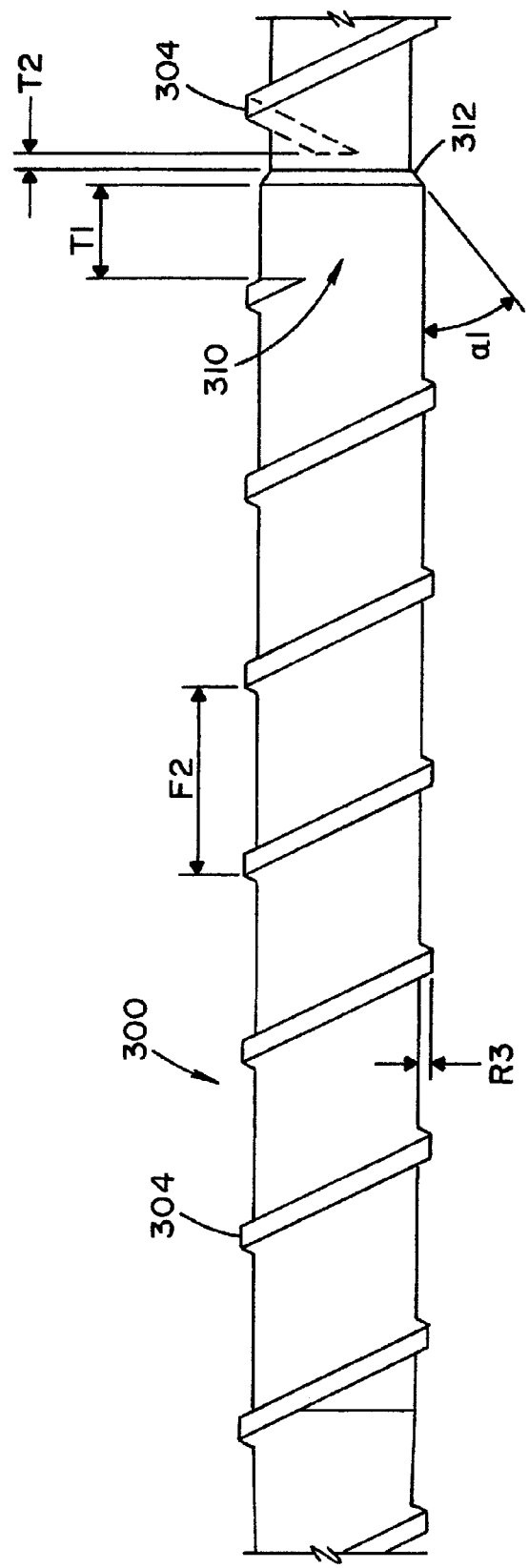

Referring now to FIGS. 3-6, the root depth of the screw varies along the length of the screw. Generally, root depths R1 and R2 are the same or similar; however, this is not required. As such, in zone Z1, the root depth remains generally constant. The root depth can change in zones Z2 and/or Z3. As illustrated in FIGS. 5-6, the root depth reduces; however, this is not required. The flight length F2 generally remains constant while the root depth reduces; however, this is not required. The percentage of reduction of root depth in zone Z2 and/or Z3 is non-limiting. Generally, the root depth reduces by at least 10%, typically at least about 20%, more typically about 20-90%, and still more typically about 25-80%. For example, for an 8-inch width screw, the root depth of R1 and R2 can be about 1.5 inches and the root depth of R3 can be about 0.45 inches (a 70% decrease); however, other root depth reduction amounts can be used.

The screw can include one or more flight breaks along the length of the screw; however, this is not required. One such flight break is illustrated in FIGS. 2 and 6. The first flight break 310 on the screw is located just prior to the location of the water-out port 150 illustrated in FIG. 2. The flight break and water-out port are illustrated to be located in zone Z3; however, this is not required. As illustrated in FIG. 6, the root depth has decreased prior to the flight break; however, this is not required. Flight break 310, when used, allows the softened and/or liquid feed material to form a plug to prevent gases such as water vapor from back flowing in the extuder system. The length T1 of the flight break is non-limiting. Generally, the length T1 is at least about 10% of the flight length F2, more typically at least about 20% of the flight length F2, more typically about 20-90% of flight length F2, and still more typically about 25-70% of the flight length F2. For example, for an 8-inch width screw, the flight length F2 is about 8 inches and the flight break length T1 is about 4 includes (50% the flight length); however, other lengths can be used. The water-out port is designed to remove gases that have formed during the heating of the feedstock. The port can be under vacuum; however, this is not required. The size and configuration of the port is non-limiting. More than one water out port can be used. The plug formed by the flight break results in little, if any, back flow of gasses in the barrel liner, thereby result in a majority or up to 100% of the formed gasses being removed by one or more of the water-out ports.

Figure 7:
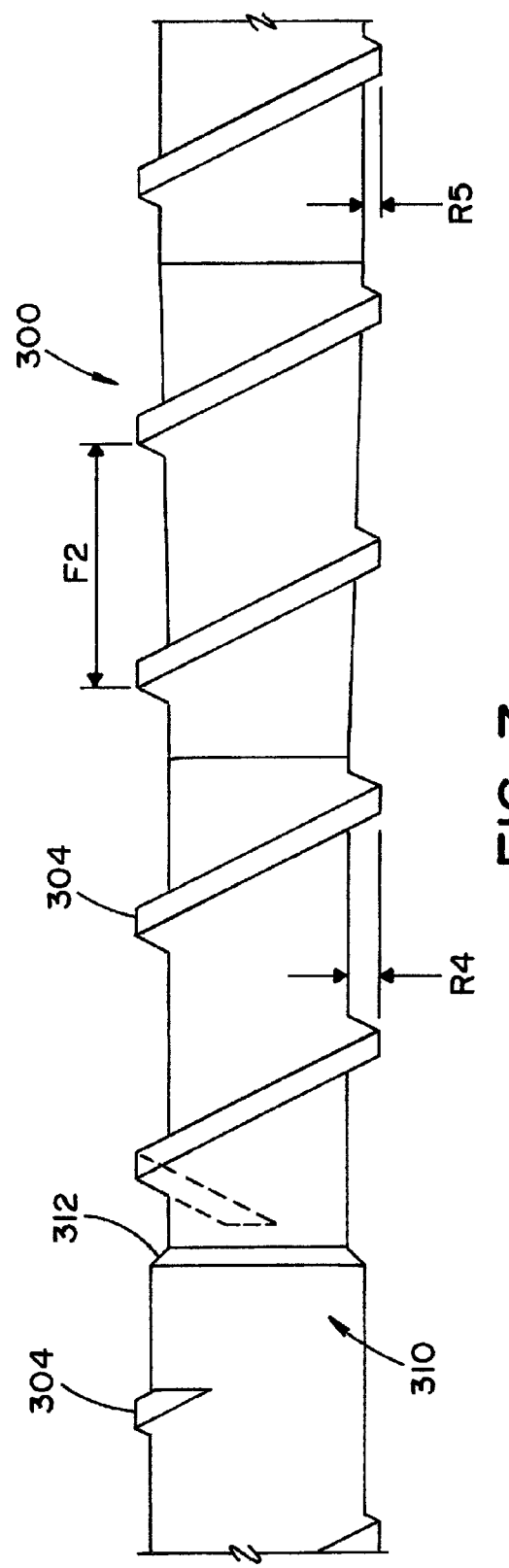

Referring now to FIGS. 6-7, the root depth R4 of the screw can increase at or near the location of the water-out port 150; however, this is not required. The percentage of increase of root depth R4 to root depth R3 is non-limiting. Generally, the root depth increases by at least 10%, typically at least about 20%, more typically about 20-200%, and still more typically about 50-150%. For example, for an 8-inch width screw, the root depth of R3 can be about 0.45 inches and the root depth of R4 can be about 1 inch (a 122% increase); however, other root depth increased amounts can be used.

An angled transition zone 312 can be included on the screw; however, this is not required. The angle α1 of the transition zone is not limiting. The angle α1 of the transition zone is generally about 5-75°, typically about 10-60°, and more typically about 20-60°. In one non-limiting configuration, angle α1 of the transition zone is 45°. The length of the transition zone, when used, is generally less than the length T1 of flight break 310; however, this is not required. The increased root depth R4 results in a pressure drop along the screw, thereby facilitating in reducing the incidence of back flow of the gases in the barrel liners. As such, the pressure drop in combination with the material plug caused by flight break 310 in the screw reduces gas back flow and ensures that at least a majority of the gas (e.g., water vapor, etc.) exits the water-out port 150. The pressure drop also inhibits material flow out of the water-out port. As such, the melted and/or softened feed material continues its flow along the screw, and little, if any, of the melted and/or softened feed material exits the water-out port 150.

As illustrated in FIGS. 2, 6 and 7, the flights on the screw begin after transition zone 312. It is illustrated that the flights begin at a distance T2 after the transition zone; however, the flights can begin at the end of the transition zone. Distance T2 is generally less than flight break length T1; however, this is not required. In one non-limiting configuration, the length of transition zone 312 can be the same as distance T2; however, this is not required. For example, for an 8-inch width screw, distance T2 can be about 0.75 inches; however, other lengths can be used. The flight length F2 is generally the same as the flight length F2 of the flights located prior to the water out opening 150; however, this is not required.

As illustrated in FIG. 7, the root depth decreases at a location after the water out port 150. This root depth decrease is illustrated in FIG. 2 as occurring in zone Z2; however, this is not required. Generally, the root depth reduces by at least 10%, typically at least about 20%, more typically about 20-90%, and still more typically about 25-80%. For example, for an 8 inch width screw, the root depth of R4 can be about 1 inch and the root depth of R5 can be about 0.63 inches (a 37% decrease); however, other root depth reduction amounts can be used. The location of the root depth change can optionally occur at or near the location of the extruder system wherein the heating jackets are replaced by the heating bands 152 as illustrated at zone Z4 in FIG. 2.

The heating bands are designed to further increase the temperature of the feed material. In one non-limiting embodiment, the heating jackets heat the feed material to about 300-500° F. and the heating bands heat the feed material to about 500-800° F., typically 500-700°, and more typically about 600-650° F.; however, the heating band and/or heating jackets can heat the feed material to other temperatures. Generally, the increase in temperature of the heating system in zone Z4 is at least about a 10% temperature increase, typically at least about a 20% temperature increase, and more typically about a 20%-300% temperature increase. As can be appreciated, all of the heating for the extruder system can be by heating jackets or by heating bands. The increase in temperature of the feedstock results in the feed material further reducing in viscosity. As such, the reduced root depth of the screw is designed to compensate for the reduced viscosity to ensure proper feeding of the feedstock along the rotating screw. The increased temperature of the feedstock results in further breaking down of the chemical bonds of the feedstock in zones Z4-Z9 as illustrated in FIG. 2. During such heating, additional gases (e.g., water vapor, HCl, etc.) separate from the feedstock.

Figure 8:
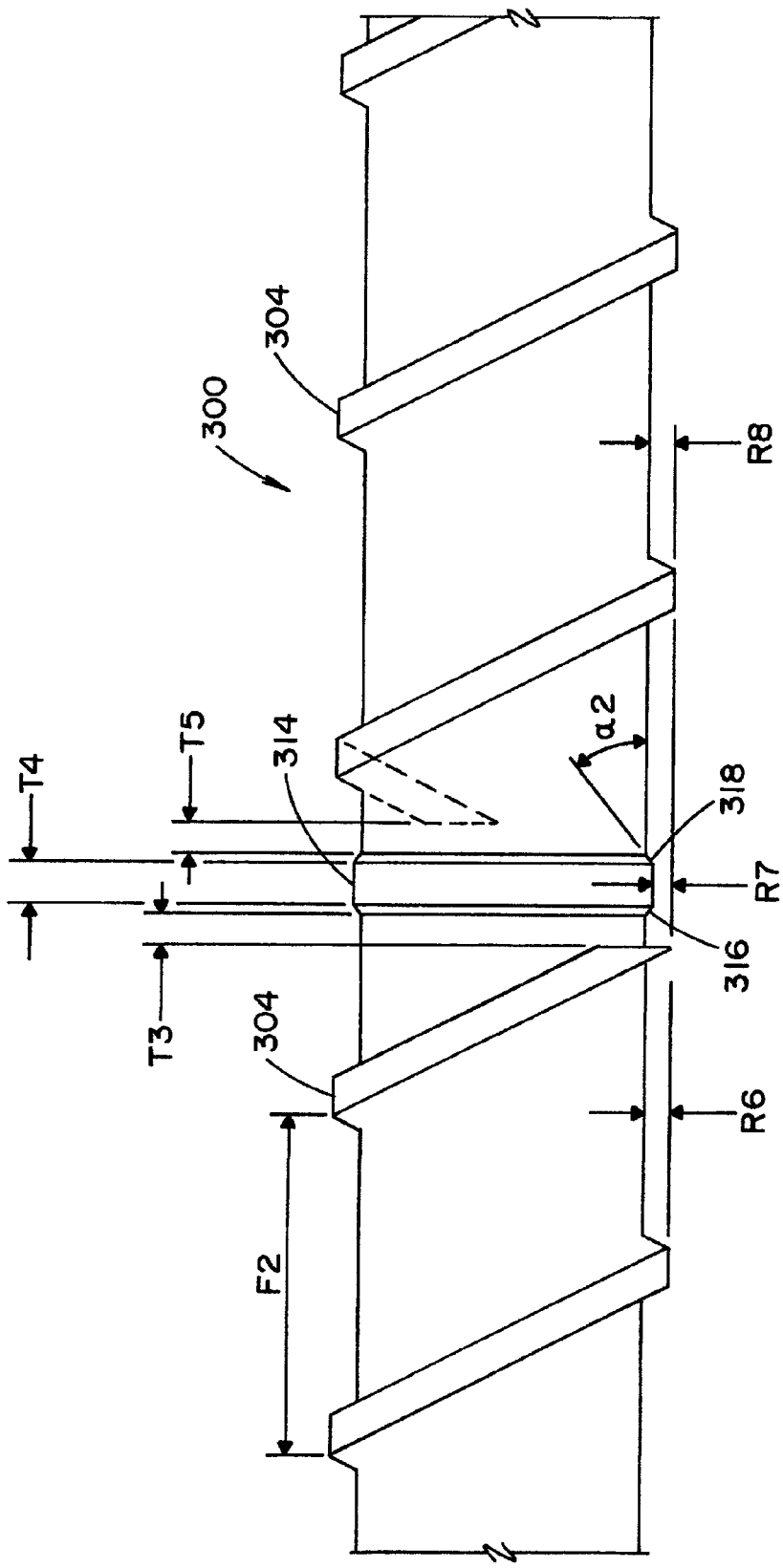
Figure 9:
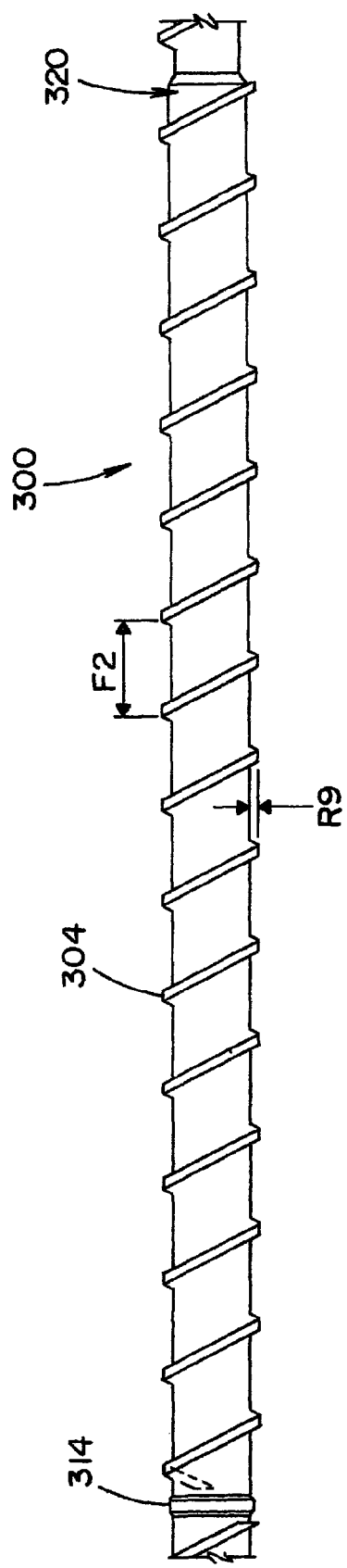

As illustrated in FIGS. 8-9, the screw 300 can optionally include a blister 314 that is located at or just prior to just after the heating jackets are changed to heating bands in zones Z3-Z4 as illustrated in FIG. 2. The blister, like the flight break that was previously discussed, is designed to cause a plug of feed material to form so as to inhibit or prevent the back flow of gases. The formed plug functions partially as a gas seal. The plug also can inhibit back flow of feed material; however, this is not required. As illustrated in FIG. 8, the root depths R6 and R8 on both sides of the blister are generally the same; however, this is not required. As can be appreciated, the root depth R8 located after the blister can be greater than prior to the blister so as to create a pressure drop; however, this is not required. Generally, the root depth reduces by the blister at least 5%, typically at least about 10%, more typically about 20-90%, and still more typically about 25-80%. For example, for an 8-inch width screw, the root depth of R6 can be about 0.63 inches and the root depth of R7 formed by blister 314 can be about 0.45 inches (a 29% decrease); however, other root depth reduction amounts can be used. Also, generally the root depth increase after the blister by at least 5%, typically at least about 10%, more typically about 20-90%, and still more typically about 25-80%. For example, for an 8-inch width screw, the root depth of R7 can be about 0.45 inches and the root depth of R8 can be about 0.63 inches (a 40% increase); however, other root depth increase amounts can be used. The spacing T3 of the flight break prior to the blister can be the same as the spacing T5 of the start of the flight break after the blister; however, this is not required. The thickness T4 of the blister is non-limiting. Generally, the thickness of the blister is the same or greater than spacing T3 and/or T5. For example, for an 8-inch width screw, the spacing T3 and T5 can be about 0.75 inches and the blister thickness T5 can be about 1 inch; however, other thickness and/or spacings can be used. The blister can optionally include a tapered front and/or rear edge. The angle $\alpha2$ of the tapered edge is non-limiting. The angle $\alpha2$ of the transition zone is generally about 5-75°, typically about 10-60°, and more typically about 20-60°. In one non-limiting configuration, angle $\alpha2$ of the tapered edges 316, 318 on both sides of the blister is 45°.

Figure 10:
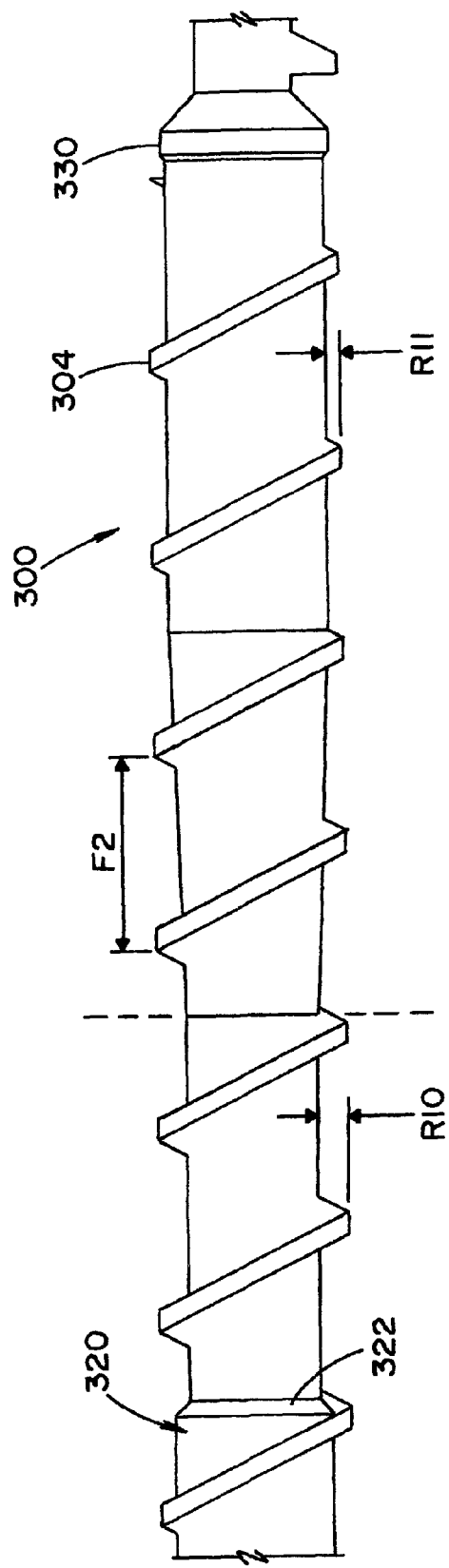

After blister 314, the root depth R9 of the screw remains generally the same as root depth R8 until the flight break 320 illustrated in FIGS. 9-10; however, this is not required. As such, in zones Z5-Z8, the flight spacing and the root depth of the screw remains generally constant; however, this is not required.

As illustrated in FIG. 2, the flight break 320 is located prior to or at HCl-out port 160. During the higher temperature heating of the feedstock, additional gases are formed in the feedstock. These gases are removed from the extruder via the HCl-out port 160. The HCL-out port can optionally be under a vacuum to facilitate in the removal of gasses. The feedstock can optionally include additives such as, but not limited to, lime, to absorb, adsorb, and/or react with and/or bind with the formed gases; however, this is not required. As illustrated in FIG. 10, flight break 320 can function similar to flight break 310 as described with reference to FIG. 6. The plug of feedstock formed by flight break 320 is designed to cause the plug to inhibit or prevent the back flow of gases. The formed plug functions partially as a gas seal. The plug also can inhibit back flow of the feedstock; however, this is not required.

As illustrated in FIG. 10, the root depth R10 after flight break 320 is greater than the root depth R9 that exists prior to flight break 320. The increased root depth is designed to create a pressure drop in the barrel liner; however, this is not required. The pressure drop, when optionally created, can be used to inhibit or prevent the flow of feedstock through the HCl-out port. Generally, the root depth increases by at least 10%, typically at least about 20%, more typically about 20-200%, and still more typically about 25-150%. For example, for an 8-inch width screw, the root depth of R9 can be about 0.63 inches and the root depth of R10 can be about 1.25 inches (a 98% increase); however, other root depth increased amounts can be used.

At a position after the HCl-out port 160, the root depth again generally decreases as illustrated in FIG. 10; however, this is not required. Generally, the root depth reduces by at least 5%, typically at least about 10%, more typically about 20-90%, and still more typically about 25-80%. For example, for an 8-inch width screw, the root depth of R10 can be about 1.25 inches and the root depth of R11 can be about 0.63 inches (a 50% decrease); however, other root depth reduction amounts can be used. As can be appreciated, extruder system E can end after HCL out port 160 and the root depth of the screw may not be decreased prior to the end of extruder system E; however, this is not required.

Once the feedstock passes the HCl-out port 160, processing by the extruder system can end and the feedstock that exits the extruder system can optionally be fed from the extruder system into a pyrolysis reactor for further processing; however, this is not required. The vertical dashed line in FIG. 2 illustrates an optional location for the termination of the extruder system and the dashed line in FIG. 10 illustrates an optional location of the termination of the screw in one non-limiting embodiment of the invention. In this embodiment, the extruder system ends at zone Z10. The end of the screw at the end of the extruder system can optionally be tapered; however, this is not required.

If the feed material is 100% plastic material, the plastic material is generally in a liquid form when exiting the extruder system; however, this is not required. If the feed material is shredded tire material, the tire material is a softened material when exiting the extruder system. As can be appreciated, since both plastic material and shredded tire material can be fed into the extruder system, the material exiting the extruder system can be both liquid and softened material. As can be appreciated, the root depths along the screw can be adjusted based on the type of feed material. When the feed material is or includes shredded tire material, the root depths are generally greater since the shredded tire material is only softened in the extruder system, not fully melted. When the feed material is only plastic material, the root depths of the screw can be less since the plastic material can become molten in the extruder system.

Referring now to FIG. 2, an optional process is disclosed. After the HCl-out port 160, there is located an optional tire-in port 170. The tire-in port, when used, is designed to feed heated shredded tire into the heated feedstock in the extruder system. In this option, a secondary extruder system E2 is integrated with extruder system E. The secondary extruder system, wen used, is integrated with extruder system E at the tire-in port 170. Several of the components of the secondary extruder system are the same or similar to the components of extruder system E. For instance, the secondary extruder system includes one or more motors 200 and one or more gear boxes 210. The type and/or size of motor and/or gear box are non-limiting. A hopper 220 is illustrated as being connected or interconnected to the gear box. The hopper is generally used to receive the feedstock. The top and/or side of the hopper includes an opening wherein feedstock can be fed into the hopper. The hopper can optionally include one or more components such as grinders 222 that are used to grind and/or shred the feedstock while located in the hopper. The grinders can include one or more grinding teeth and/or other structures that can be used to grind and/or shred the feedstock while located in the hopper. The grinders, when used, are generally driven by the motor and gear box arrangement; however, this is not required.

The feedstock that is typically fed into hopper 220 are tire components and/or other types of rubber material. The average size of the feedstock is generally less than about 3 inches, and typically less than 2 inches; however, other sizes of the feedstock pieces can be inserted into the hopper. For example, shredded tire pieces, when used, can have an average size of no greater than about 2.5 inches, and typically no greater than about 2 inches; however, other sizes can be used. When the hopper includes one or more grinders, the grinders can be designed to further grind and/or shred the feed material in the hopper; however, this is not required. All of the feedstock can be fed into the secondary extruder system at the location of the hopper. The method by which the feedstock is fed to the hopper is non-limiting (manual feeding system, conveyor feeding system, etc.). The feedstock can be preheated prior to being fed into the hopper; however, this is not required.

One or more auger barrels 230 are connected to one end of the hopper. The feedstock that is fed into the hopper is ultimately directed into the interior of the one or more auger barrels. Rotatably positioned inside the one or more auger barrels is a screw (not shown). The rotation of the screw is designed to draw the feedstock from the hopper and to move the feedstock through the barrels during the heat processing of the feedstock. The front end of the screw is connected to gear box 210. The manner in which the screw is connected to the gear box is non-limiting. The gear box is designed to cause the screw to rotate during the operation of the motor of the extruder. The width W of the screw is non-limiting. The screw includes flights. The flight spacing can vary along the length of the screw; however, this is not required. The root depth of the screw can vary along the length of the screw; however, this is not required. The type and number of flights on the screw are non-limiting. Generally, the flight spacing and root depth of the screw are constant along zones Z14-Z16; however, this is not required. The front portion of the screw can optionally include a center bore that can be used as a fluid channel to cool the front portion of the screw; however, this is not required. Generally, the length of the screw in the secondary extruder system is less than screw 300 of extruder system E; however, this is not required.

Referring again to FIG. 2, the outer surface of the barrel liners include one or more heating jackets or heating bands 240. The heating jackets or heating bands are designed to heat the feedstock as the feedstock is moved inside the barrel liners by the rotation of the screw. The number, size, and configuration of the one or more heating jackets, when used, is non-limiting. The heating jackets, when used, can be heated by fluid (e.g., heated oil, steam, etc.) flowing and/or circulating through the heating jackets and/or can be electric heaters. Generally, the heating jackets or heating bands are designed to heat the feedstock to a temperature of at least 500° F., typically 550-800° F., and more typically about 600-650° F.; however, the material can be heated to other temperatures. Generally, the shredded tire material is heated to the same temperature ±1-30° F. of the material in extruder E that is located at or just prior to tire-in port 170; however, this is not required.

Referring again to FIG. 10, when screw 300 extends beyond HCl-out port 160 and to tire-in port 170, the root depth of the screw generally decreases between HCl-out port 160 and to tire-in port 170; however, this is not required. Generally, the root depth reduces by at least 5%, typically at least about 10%, more typically about 20-90%, and still more typically about 25-80%. For example, for an 8-inch width screw, the root depth of R10 can be about 1.25 inches and the root depth of R11 can be about 0.63 inches (a 50% decrease); however, other root depth reduction amounts can be used.

Figure 11:
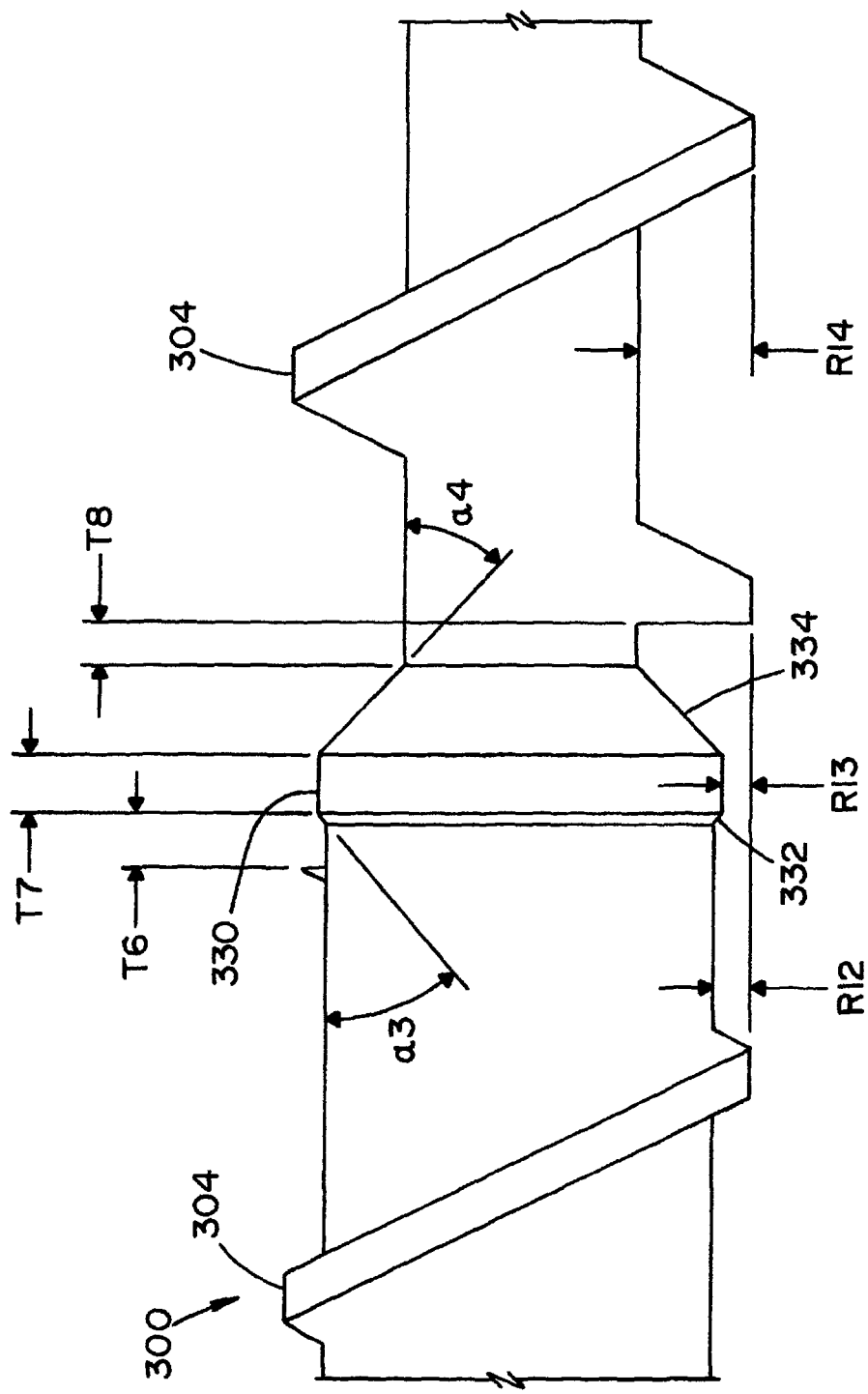

As illustrated in FIGS. 10 and 11, screw 300 can include a blister 330 that is located at or prior to the tire-in port 170. Blister 330 is designed to function in the same manner as blister 314 which is described above. As such, blister 330 inhibits or prevents gas and/or material backflow in the barrel liner. As illustrated in FIG. 11, the root depth R14 located after the blister is greater than the root depth R12 located prior to the blister so as to create a pressure drop after the blister; however, this is not required. Generally, the root depth reduces by the blister at least 5%, typically at least about 10%, more typically about 20-90%, and still more typically about 25-80%. For example, for an 8 inch width screw, the root depth of R12 can be about 0.63 inches and the root depth of R13 formed by blister 330 can be about 0.45 inches (a 29% decrease); however, other root depth reduction amounts can be used. Also, generally the root depth increases after the blister by at least 5%, typically at least about 10%, more typically about 20-600%, and still more typically about 25-400%. For example, for an 8 inch width screw, the root depth of R13 can be about 0.45 inches and the root depth of R14 can be about 2 inches (a 345% increase); however, other root depth increase amounts can be used. A flight break can optionally exist prior to and/or after blister 330. As illustrated in FIG. 11, the spacing T6 of the flight break prior to the blister can be the same as the spacing T8 of the start of the flight break after the blister; however, this is not required. The thickness T7 of the blister is non-limiting. Generally, the thickness of the blister is the same or greater than spacing T6 and/or T8. For example, for an 8-inch width screw, the spacing T6 and T8 can be about 0.75 inches and the blister thickness T7 can be about 1 inch; however, other thickness and/or spacings can be used. The blister can optionally include a tapered front and/or rear edge. The angle α3 and α4 of the tapered edge is non-limiting. The angle α3 and α4 of the transition zone can be the same or different. For example, angle α3 and α4 is generally about 5-75°, typically about 10-60°, and more typically about 20-60°. In one non-limiting configuration, angle α3 and α4 of the tapered edges 332, 334 on both sides of the blister is 45°. As illustrated in FIG. 11, transition edge 334 has a greater width than transition edge 332; however, this is not required.

Figure 12:
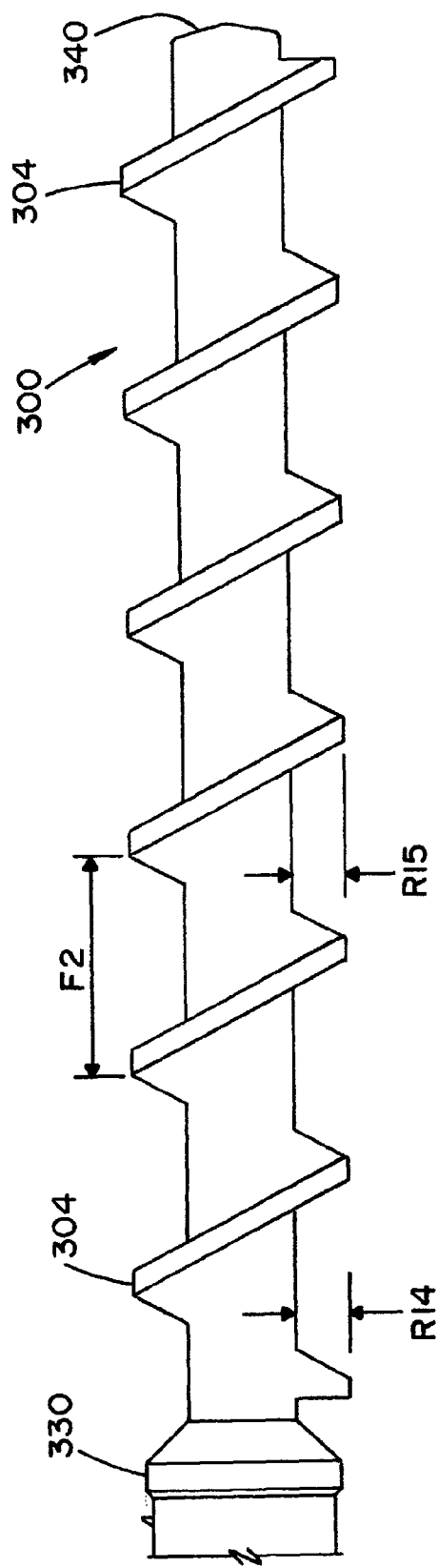

The root depth of screw 300 generally increases at or after the location of the tire-in port 170 so that screw 300 can accommodate the additional shredded tire material entering tire-in port 170 from the secondary extruder system E2. As illustrated in FIG. 12, the root depth remains generally constant along the remainder of screw 300; however, this is not required. For example, for an 8-inch width screw, the root depth of R14 can be about 2 inches and the root depth of R15 can also be about 2 inches; however, other root depth reduction amounts can be used. The end of screw 300 can optionally include a tapered end 340.

Once the feedstock passes exits the end of the screw, processing by the extruder system can end and the feedstock that exits the extruder system can optionally be fed from the extruder system into a pyrolysis reactor for further processing; however, this is not required. The material exiting the extruder system can be both liquid and softened material.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. An extruder for processing hydrocarbon-containing material comprising:
   a motor;
   a gear box that is connected or interconnected to said motor;
   an auger barrel;
   a screw rotatably positioned in said auger barrel, said screw connected or interconnected to said gear box such that said gear box causes said screw to rotate when said motor is activated, said screw includes a flight positioned on an outer surface of a core of said screw, said flight extending along at least a portion of a longitudinal length of said screw, said flight having a flight spacing, said screw having a variable root depth along said longitudinal length of said screw wherein said root depth is defined by a distance between said outer surface of said core of said screw and a top surface of said flight on said screw, said screw including a first and second portions, a first end of said first portion connected or interconnected to said gear box, a second end of said first portion connected to a first end of said second portion, a flight spacing of said first portion decreasing from said first end to said second end of said first portion, said root depth of said first portion decreasing from said first end to said second end of said first portion, said first and second portions of said screw separated by a first flight break; and,
   a heating system positioned about at least a portion of said auger barrel, said heating system heating said hydrocarbon-containing material as said hydrocarbon-containing material moves through said auger barrel as said screw rotates.

2. The extruder as defined in claim 1, wherein said screw includes a blister that is located between a flight break positioned on an outer surface of a core of said screw.

3. The extruder as defined in claim 2, wherein said flight break exists prior to, after, or combinations thereof of said blister.

4. The extruder as defined in claim 1, wherein said screw includes a fluid cooling channel in a core of said screw that is designed to cool said screw.

5. The extruder as defined in claim 1, including a hopper, said hopper designed to receive said hydrocarbon-containing material and to direct said hydrocarbon-containing material into said auger barrel, said hopper includes grinder elements to reduce a size of said hydrocarbon-containing material prior to said hydrocarbon-containing material entering said auger barrel.

6. The extruder as defined in claim 1, wherein said heating system includes heating jackets, heating bands, or combinations thereof.

7. The extruder as defined in claim 1, including a gas port in said auger barrel to facilitate in removal of gasses from said auger barrel prior to said hydrocarbon containing material exiting an end of said auger barrel and an end of said screw.

8. The extruder as defined in claim 1, wherein said screw including one or more features that are designed to create a plug of said hydrocarbon-containing material prior to a location of said gas port to limit or prevent backflow of gases through said auger barrel, said one or more features including features selected from the group consisting of a) said root depth varying along said longitudinal length of said screw, b) said flight having at least one flight break along said longitudinal length of said screw, and c) a blister that is located between a flight positioned on an outer surface of a core of said screw.

9. The extruder as defined in claim 7, wherein said screw including one or more features designed to create a pressure drop in auger barrel at a location after said gas port to limit or prevent backflow of gases through said auger barrel, to limit escape of said hydrocarbon-containing material through said gas port, or combinations thereof, said one or more features including features selected from the group consisting of a) said flight spacing varying along said longitudinal length of said screw, b) said root depth varying along said longitudinal length of said screw, c) said flight having at least one flight break along said longitudinal length of said screw, and d) a blister that is located between a flight positioned on an outer surface of a core of said screw.

10. The extruder as defined in claim 1, including a secondary extruder system connected to said auger barrel, said secondary extruder system feeding a secondary source of heated hydrocarbon-containing material into said auger barrel to be mixed with heated hydrocarbon-containing material that is moving through said auger barrel, said secondary extruder system including a secondary motor, a secondary gear box that is connected or interconnected to said secondary motor, a secondary auger barrel, and a secondary screw rotatably positioned in said secondary auger barrel, said secondary screw connected or interconnected to said secondary gear box such that said secondary gear box causes said secondary screw to rotate when said secondary motor is activated, said secondary screw configured to cause said secondary source of heated hydrocarbon-containing material to move through said secondary auger barrel when said secondary screw rotates and to be deposited in said auger barrel.

11. An extruder system for processing hydrocarbon-containing material comprising:
    a motor;
    a gear box that is connected or interconnected to said motor;
    an auger barrel, said auger barrel including a fluid port located between front and rear ends of said auger barrel, said fluid port configured to enable one or more fluids to be removed from an interior of said auger barrel prior to said hydrocarbon-containing material exiting said rear end of said auger barrel;
    a screw rotatably positioned in said auger barrel, said screw connected or interconnected to said gear box such that said gear box causes said screw to rotate when said motor is activated, said screw configured to cause said hydrocarbon-containing material to move through said auger barrel when said screw rotates, said screw comprising a core having an outer surface, said screw including a flight positioned on said outer surface of said core, said flight extending along at least a portion of a longitudinal length of said screw, said flight having a flight spacing, said screw includes a root depth that is defined by a distance between an outer surface of said core of said screw and a top surface of said flight on said screw, said screw including first and second portions, a first end of said first portion connected or interconnected to said gear box, a second end of said first portion connected to a first end of said second portion, a flight spacing of said first portion decreasing from said first end to said second end of said first portion, said root depth of said first portion decreasing from said first end to said second end of said first portion, said first and second portions of said screw separated by a first flight break; and, a heating system positioned about at least a portion of said auger barrel, said heating system configured to heat said hydrocarbon-containing material as said hydrocarbon-containing material moves through said auger barrel as said screw rotates.

12. The extruder as defined in claim 11, wherein the screw includes a blister.

13. The extruder as defined in claim 11, wherein said screw includes a plurality of root depth changes along said longitudinal length of said screw.

14. The extruder as defined in claim 13, wherein said screw includes a plurality of flight breaks along said longitudinal length of said screw.

15. The extruder as defined in claim 11, wherein said screw includes a fluid cooling channel in a core of said screw that is configured to cool said screw.

16. The extruder as defined in claim 11, further including a hopper, said hopper configured to receive said hydrocarbon-containing material and to direct said hydrocarbon-containing material into said auger barrel, said hopper includes grinder elements to reduce a size of said hydrocarbon-containing material prior to said hydrocarbon-containing material entering said auger barrel.

17. The extruder as defined in claim 11, wherein said heating system includes one or more heating jackets, heating bands, or combinations thereof.

18. The extruder as defined in claim 11, wherein said screw including one or more of said features to create a plug of said hydrocarbon-containing material prior to a location of said fluid port in said auger barrel to limit or prevent backflow of gases through said auger barrel.

19. The extruder as defined in claim 11, further includes a secondary extruder system connected to said auger barrel, said secondary extruder system feeding heated hydrocarbon-containing material into said auger barrel to be mixed with heated hydrocarbon-containing material that is moving through said auger barrel, said secondary extruder system including a secondary motor, a secondary gear box that is connected or interconnected to said secondary motor, a secondary auger barrel, and a secondary screw rotatably positioned in said secondary auger barrel, said secondary screw connected or interconnected to said secondary gear box such that said secondary gear box causes said secondary screw to rotate when said secondary motor is activated, said secondary screw configured to cause said secondary source of heated hydrocarbon-containing material to move through said secondary auger barrel when said secondary screw rotates and to be deposited in said auger barrel.

20. An extruder system for processing hydrocarbon-containing material comprising:
a motor;
a gear box that is connected or interconnected to said motor;
an auger barrel, said auger barrel including a fluid port locate between front and rear ends of said auger barrel, said fluid port configured to enable one or more fluids to be removed from an interior of said auger barrel prior to said hydrocarbon-containing material exiting said rear end of said auger barrel;

a screw rotatably positioned in said auger barrel, said screw connected or interconnected to said gear box such that said gear box causes said screw to rotate when said motor is activated, said screw configured to cause said hydrocarbon-containing material to move through said auger barrel when said screw rotates, said screw comprising a core having an outer surface, said screw including a flight positioned on said outer surface of said core, said flight extending along at least a portion of a longitudinal length of said screw, said flight having a flight spacing, said screw includes a root depth that is defined by a distance between an outer surface of said core of said screw and a top surface of said flight on said screw, said screw including a first, second and third portions, a first end of said first portion connected or interconnected to said gear box, a second end of said first portion connected to a first end of said second portion, a second end of said second portion connected to a first end of said third portion, a flight spacing of said first portion decreasing from said first end to said second end of said first portion, said first and second portions of said screw separated by a first flight break, said second and third portions of said screw separated by a second flight break; and, a heating system positioned about at least a portion of said auger barrel, said heating system configured to heat said hydrocarbon-containing material as said hydrocarbon-containing material moves through said auger barrel as said screw rotates, said heating system including a heating jacket, a heating band, or combinations thereof.

21. The extruder as defined in claim 20, wherein at least one heating jacket is positioned about an outer surface of said auger barrel to heat said hydrocarbon-containing material in said first portion of said auger, at least one heating band is positioned about an outer surface of said auger barrel to heat said hydrocarbon-containing material in said third portion of said auger, a temperature of said hydrocarbon-containing material in said third portion of said auger at least partially caused by said heating band is greater than a temperature of said hydrocarbon-containing material in said first portion of said auger at least partially caused by said heating jacket.

22. The extruder as defined in claim 20, wherein said first portion of said screw includes a fluid cooling channel in a core of said screw that is configured to cool said screw.

23. The extruder as defined in claim 21, wherein said first portion of said screw includes a fluid cooling channel in a core of said screw that is configured to cool said screw.

24. The extruder as defined in claim 20, wherein said screw includes one or more of said features to create a plug of said hydrocarbon-containing material prior to a location of said fluid port in said auger barrel to limit or prevent backflow of gases through said auger barrel.

25. The extruder as defined in claim 23, wherein said screw includes one or more of said features to create a plug of said hydrocarbon-containing material prior to a location of said fluid port in said auger barrel to limit or prevent backflow of gases through said auger barrel.

26. The extruder as defined in claim 20, that further includes a secondary extruder system connected to said auger barrel, said secondary extruder system feeding heated hydrocarbon-containing material into said auger barrel to be mixed with heated hydrocarbon-containing material that is moving through said auger barrel, said secondary extruder system including a secondary motor, a secondary gear box that is connected or interconnected to said secondary motor, a secondary auger barrel, and a secondary screw rotatably positioned in said secondary auger barrel, said secondary screw connected or interconnected to said secondary gear box such that said secondary gear box causes said secondary screw to rotate when said secondary motor is activated, said secondary screw configured to cause said secondary source of heated hydrocarbon-containing material to move through said secondary auger barrel when said secondary screw rotates and to be deposited in said auger barrel, said root depth of said auger at said location of said secondary source of heated hydrocarbon-containing material is added to said auger barrel is greater than said root depth of said auger of said second portion of said auger.

27. The extruder as defined in claim 25, further includes a secondary extruder system connected to said auger barrel, said secondary extruder system feeding heated hydrocarbon-containing material into said auger barrel to be mixed with heated hydrocarbon-containing material that is moving through said auger barrel, said secondary extruder system including a secondary motor, a secondary gear box that is connected or interconnected to said secondary motor, a secondary auger barrel, and a secondary screw rotatably positioned in said secondary auger barrel, said secondary screw connected or interconnected to said secondary gear box such that said secondary gear box causes said secondary screw to rotate when said secondary motor is activated, said secondary screw configured to cause said secondary source of heated hydrocarbon-containing material to move through said secondary auger barrel when said secondary screw rotates and to be deposited in said auger barrel, said root depth of said auger at said location of said secondary source of heated hydrocarbon-containing material is added to said auger barrel is greater than said root depth of said auger of said second portion of said auger.

\* \* \* \* \*